United States Patent
Raslambekov

(10) Patent No.: US 10,631,956 B1
(45) Date of Patent: Apr. 28, 2020

(54) METHODS AND SYSTEMS FOR MAKING AN ORTHODONTIC ALIGNER HAVING FIXING BLOCKS

(71) Applicant: Oxilio Ltd, Larnaca (CY)

(72) Inventor: Islam Khasanovich Raslambekov, Long Island City, NY (US)

(73) Assignee: Oxilio Ltd, Larnaca (CY)

( * ) Notice: Subject to any disclaimer, the term of this patent is extended or adjusted under 35 U.S.C. 154(b) by 0 days.

(21) Appl. No.: 16/703,407

(22) Filed: Dec. 4, 2019

(51) Int. Cl.
*A61C 7/08* (2006.01)
*A61C 13/34* (2006.01)
*A61C 7/00* (2006.01)
*A61C 19/05* (2006.01)
*A61C 9/00* (2006.01)

(52) U.S. Cl.
CPC .............. *A61C 7/08* (2013.01); *A61C 7/002* (2013.01); *A61C 9/004* (2013.01); *A61C 13/34* (2013.01); *A61C 19/05* (2013.01)

(58) Field of Classification Search
CPC ............ A61C 7/08; A61C 7/002; A61C 13/34
See application file for complete search history.

(56) References Cited

U.S. PATENT DOCUMENTS

| | | | |
|---|---|---|---|
| 5,454,717 A | 10/1995 | Andreiko et al. | |
| 7,077,646 B2 | 7/2006 | Hilliard | |
| 7,801,632 B2 | 9/2010 | Orth et al. | |
| 7,831,322 B2 | 11/2010 | Liu et al. | |
| 8,439,672 B2 | 5/2013 | Matov et al. | |
| 8,562,339 B2 | 10/2013 | Raby et al. | |
| 9,107,722 B2 | 8/2015 | Matov et al. | |
| 9,349,182 B2 | 5/2016 | Milch | |
| 9,939,999 B2 | 4/2018 | Wen et al. | |
| 9,949,804 B2 | 4/2018 | Schlimper et al. | |
| 10,136,965 B2 | 11/2018 | Wiechmann et al. | |
| 10,136,970 B2 * | 11/2018 | Pesach | G06T 1/0007 |
| 10,179,035 B2 | 1/2019 | Shivapuja et al. | |
| 2006/0275736 A1 | 12/2006 | Wen et al. | |

(Continued)

FOREIGN PATENT DOCUMENTS

CN        104970891 A      10/2015

OTHER PUBLICATIONS

Krey, "3D-printed orthodontic brackets—proof of concept", Int J Comput Dent. 2016;19(4), Abstract Only.

*Primary Examiner* — Grace Q Li
(74) *Attorney, Agent, or Firm* — BCF LLP

(57) ABSTRACT

A method for generating an aligner configured to be coupled to a tooth, the aligner having a body defining a channel arranged for receiving the tooth and a fixing block arranged for coupling the aligner and the tooth, the method comprising acquiring a tooth model, defining a zone on the tooth model, determining, based on the zone, a tooth-coupling surface for coupling the tooth with the aligner, generating, based on the tooth model, a body model by generating an inner surface of the body model based on the tooth model, generating, based on the determined tooth-coupling surface, a fixing block-coupling surface indicative of an outer surface of the fixing block by extruding the tooth-coupling surface by an interference length to inward of the tooth model so as to generate a block model having the fixing block-coupling surface, generating the aligner model by joining the block model with the body model.

20 Claims, 12 Drawing Sheets

(56) References Cited

U.S. PATENT DOCUMENTS

| | | |
|---|---|---|
| 2015/0305830 A1 | 10/2015 | Howard et al. |
| 2015/0366638 A1 | 12/2015 | Kopelman et al. |
| 2016/0067013 A1 | 3/2016 | Morton et al. |
| 2016/0242870 A1 | 8/2016 | Matov et al. |
| 2017/0100210 A1 | 4/2017 | Wen et al. |
| 2018/0055600 A1 | 3/2018 | Matov et al. |
| 2018/0125338 A1 | 5/2018 | Pfeiffer et al. |
| 2018/0303581 A1 | 10/2018 | Martz et al. |
| 2019/0046295 A1 | 2/2019 | Morton et al. |
| 2020/0000552 A1* | 1/2020 | Mednikov .............. G16H 50/50 |

* cited by examiner

Receiving a treatment plan outlining a desired shape of the aligner body 14 — 342

FIG. 8

Determining the interference length of the fixing blocks 11 — 352

Generating a digital mold model 203 representing the aligner mold 46 — 354

Chamfering an outer boundary of the cut-out region 206 to define the chamfer 208 — 356

Transmitting instructions indicative of the digital mold model 203 to a device of the manufacturing apparatus 130 — 358

FIG. 9

METHODS AND SYSTEMS FOR MAKING AN ORTHODONTIC ALIGNER HAVING FIXING BLOCKS

FIELD

The present technology relates to methods and systems for making orthodontic aligners having fixing blocks.

BACKGROUND

In orthodontics, treatments for achieving alignment of malposed teeth in a subject include applying orthodontic appliances, such as orthodontic aligners, to the subject's teeth. Orthodontic aligners are typically worn over the teeth of the top and/or bottom archforms in order to exert loads to the teeth to induce tooth movements or to retain tooth positions relative to the maxilla and/or mandible. Although they are removable, aligners are typically arranged to be worn for extended periods during the day and/or night.

Aligners are custom-designed, typically in terms of shape and thickness, to the subject's teeth and an orthodontic treatment for exerting desired loading conditions to the teeth. In order to attain a desired correction, a sequence of consecutive treatment stages using a sequence of aligners, respectively configured to exert certain desired loading conditions, may be needed. Generally, the shapes of the aligners and their thickness, among other factors, determine effective loading conditions that may be exerted to the teeth and effective correction that may be attained with each aligner of the sequence.

Under certain circumstances, aligners may be positioned inadequately relative to the teeth when applied thereto, resulting in effective loading conditions that depart from the desired loading conditions. Such circumstances may arise for example in absence of a fixed connection between the teeth and the aligners for holding the aligners in a desired, adequate position, determined for example based on the desired loading conditions. Conventional means for rigidly connecting conventional aligners to teeth include teeth attachments and aligner recesses. For example, a tooth attachment may be disposed on a given tooth. A given aligner, custom-designed to the given tooth and its tooth attachment, may have an aligner recess defined inward its inner surface such that when the given aligner is in the adequate position relative to the given tooth, the tooth attachment is received in the aligner recess, fixedly connecting the given aligner to the given tooth. In use, under some such circumstances, the tooth attachment may become detached from the given tooth, rendering loose any attempted connection between the given aligner and the given tooth. Under other such circumstances, the tooth attachment may need to be clinically detached from the given tooth, for example for the purposes of manufacturing a subsequent aligner based on a subsequent orthodontic treatment plan. Wearing the given aligner to the given tooth until the subsequent aligner is ready may be insufficient to maintain the given tooth in position due to the absence of the fixed connection.

SUMMARY

It is an object of the present technology to ameliorate at least some of the inconveniences present in the prior art.

Embodiments of the present technology have been developed based on developers' appreciation of certain shortcomings associated with known conventional orthodontic aligners and with existing methods and systems used for making such known conventional orthodontic aligners.

Hence, according to broad aspects and embodiments of the present technology, there are provided methods and systems of making orthodontic aligners which at least partially alleviate or solve the abovementioned problems.

According to one aspect, there is provided a method for generating a digital aligner model of a desired aligner configured to be operatively coupled to a tooth of a given dental archform when in a desired orthodontic relationship relative to the tooth, the desired aligner having: an aligner body defining a channel arranged for receiving the tooth so as to establish the desired orthodontic relationship; and a fixing block defined on the aligner body and extending into the channel, the fixing block being arranged relative to the aligner body for operatively coupling the aligner and the tooth, the method being implemented by a processor of a computer system, the method comprising: acquiring a digital archform model representing the given dental archform, the digital archform model including a digital tooth model representing the tooth; defining a dark zone on the digital tooth model, the dark zone being representative of a portion of the tooth sheltered from a ray of light incident toward an occlusal side of the tooth; determining, based on the dark zone, a tooth-coupling surface being indicative of an outer surface of the tooth for operatively coupling the tooth with the desired aligner; generating, based on the digital tooth model, a digital aligner body model by generating an inner body surface of the digital aligner body model based on the digital tooth model, the inner body surface having the channel of the desired aligner; generating, based on the determined tooth-coupling surface, a fixing block coupling surface being indicative of an outer surface of the fixing block of the desired aligner by digitally extruding the tooth-coupling surface by an interference length to inward of the digital tooth model so as to generate a digital fixing block model, the digital fixing block model having the generated fixing block coupling surface; generating the digital aligner model by joining the digital fixing block model with the digital aligner body model.

In certain embodiments, the determining the tooth-coupling surface includes: determining mesial and distal surfaces of the dark zone; subtracting the determined mesial and distal surfaces from the dark zone so as to define a remainder surface, the determined tooth-coupling surface being based on the remainder surface.

In certain embodiments, the determining the tooth-coupling surface includes normalizing the defined remainder surface so as to define the tooth-coupling surface.

In certain embodiments, the method further comprises defining a recessed region in the digital tooth model for generating a digital mold model for producing a thermoforming mold for making the desired aligner, the defining the recessed region including defining a cut-out region in the digital tooth model, the defined cut-out region being sized for receiving the generated digital fixing block model.

In certain embodiments, the defining the recessed region includes chamfering an outer boundary of the defined cut-out region.

In certain embodiments, the method further comprises transmitting the digital mold model to a 3D printer for producing the thermoforming mold for making the desired aligner.

In certain embodiments, the method further comprises determining the interference length such that when the desired aligner is operatively coupled to the tooth, the desired aligner is retained in the orthodontic relationship relative to the tooth.

In certain embodiments, the interference length is predetermined.

In certain embodiments, the interference length is 0.1 mm.

In certain embodiments, the determining the dark zone with respect to the tooth comprises orienting the given dental archform relative to the ray of light in a desired orientation so as to cause a portion of the tooth to be sheltered from the ray of light.

In certain embodiments, the desired orientation is predetermined.

In certain embodiments, the method further comprises receiving a treatment plan outlining a desired shape of the aligner body.

In certain embodiments, the determining the mesial surface and the distal surface comprises determining an occlusal surface, a buccal surface and a lingual surface from the digital tooth model, the mesial surface and the distal surface respectively forming portions of the digital tooth model excluding the occlusal, buccal and lingual surfaces.

In certain embodiments, the occlusal surface represents the occlusal side of the tooth; the lingual surface is oriented orthogonally relative to the occlusal surface and faces inwardly of a curve of the digital archform model; and the buccal surface is oriented orthogonally relative to the occlusal surface and faces outwardly of the curve of the digital archform model.

In certain embodiments, the determining the mesial surface and the distal surface comprises: determining an anatomical center point of the digital tooth model; an the curve based on a plurality of given points defined relative to the digital archform model, the plurality of given points including the anatomical center point of the digital tooth model.

In certain embodiments, at least one of the plurality of given points is an anatomical center of a second digital tooth model of the digital archform model.

In certain embodiments, the determining the mesial surface and the distal surface comprises determining a geometrical curve center point being equidistant from each one of the plurality of given points.

In certain embodiments, the anatomical center point of the digital tooth model is intermediate distal and mesial points of the digital tooth model; the distal point and the mesial point define a distal-mesial tooth axis; a lingual-buccal tooth axis is defined through the anatomical center point of the digital tooth model and orthogonally to the distal-mesial tooth axis; the lingual and buccal surfaces are respectively circumscribed within a certain angle range originating from the anatomical center point of the digital tooth model and defined relative to the lingual-buccal tooth axis; and the lingual surface is distinguished from the buccal surface due to being oriented generally toward the geometrical curve center point.

In certain embodiments, the aligner body and the fixing block are unitarily formed.

According to another aspect, there is provided a system for generating a digital aligner model of a desired aligner configured to be operatively coupled to a tooth of a given dental archform when in a desired orthodontic relationship relative to the tooth, the desired aligner having: an aligner body defining a channel arranged for receiving the tooth so as to establish the desired orthodontic relationship; and a fixing block defined on the aligner body, the fixing block being arranged relative to the aligner body for operatively coupling the aligner to the tooth; the system comprising a processor of a computer system, the processor arranged to execute a method comprising: acquiring a digital archform model representing the given dental archform, the digital archform model including a digital tooth model representing the tooth; defining a dark zone on the digital tooth model, the dark zone being representative of a portion of the tooth sheltered from a ray of light incident toward an occlusal side of the tooth; determining, based on the dark zone, a tooth-coupling surface being indicative of an outer surface of the tooth for operatively coupling the tooth with the desired aligner; generating, based on the digital tooth model, a digital aligner body model by generating an inner body surface of the digital aligner body model based on the digital tooth model, the inner body surface having the channel of the desired aligner; generating, based on the determined tooth-coupling surface, a fixing block coupling surface being indicative of an outer surface of the fixing block of the desired aligner by digitally extruding the tooth-coupling surface by an interference length to inward of the digital tooth model so as to generate a digital fixing block model, the digital fixing block model having the generated fixing block coupling surface; generating the digital aligner model by joining the digital fixing block model with the digital aligner body model.

In the context of the present specification, unless expressly provided otherwise, the expressions "mesial" and "distal" designate opposite directions relative to a midline of a given dental arch, "labial" and "palatal" designate opposite directions orthogonal to the mesial and distal directions for the given dental arch being a maxilla (i.e., upper arch), and "buccal" and "lingual" designate opposite directions orthogonal to the mesial and distal directions for the given dental arch being a mandible (i.e., a lower arch). The midline is the midsagittal line of the given dental arch and/or a line intermediate central incisors of the given dental arch. Mesial designates toward the midline and distal designates away from the midline. Labial designates away from the given upper dental arch toward an inside of an upper lip. Palatal designates away from the given upper dental arch toward a palate. Buccal designates away from the given lower dental arch toward an inside of a lower lip. Lingual designates away from the given lower dental arch toward a tongue of the subject.

In the context of the present specification, where whether a given dental arch is a maxilla or a mandible is not expressly provided, either buccal and lingual or labial and palatal can be used to describe directions with respect to the given dental arch.

In the context of the present specification, unless expressly provided otherwise, the expressions "coronal" and "apical" designate opposite directions relative to a given tooth. Coronal designates toward an incisal/occlusal portion of the given tooth and apical designates toward a root tip/apex of the given tooth.

In the context of the present specification, unless expressly provided otherwise, a computer system may refer, but is not limited to, an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 8 illustrates certain other steps of the method of FIG. 7 for making the orthodontic aligner, according to certain embodiments of the present technology;

FIG. 9 illustrates certain other steps of the method of FIG. 7 for making the orthodontic aligner, according to certain embodiments of the present technology;

It should be noted that, unless otherwise explicitly specified herein, the drawings are not to scale and consist in schematic representations of the present technology.

DETAILED DESCRIPTION

Certain aspects and embodiments of the present technology are directed to methods and systems for making an orthodontic aligner (also referred to as "aligner"), as well as to the aligner itself. More specifically, certain aspects and embodiments of the present technology comprise a computer-implemented method and systems making an aligner having fixing blocks.

Figure 1:
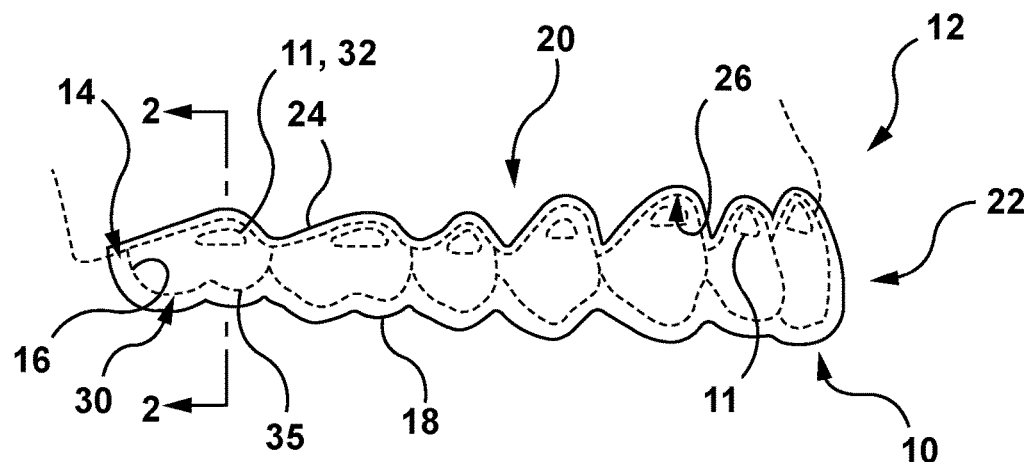
FIG. 1 is a schematic illustration of a side view of an orthodontic aligner according to certain embodiments of the present technology, shown in use on an upper arch of a subject.
Figure 2:
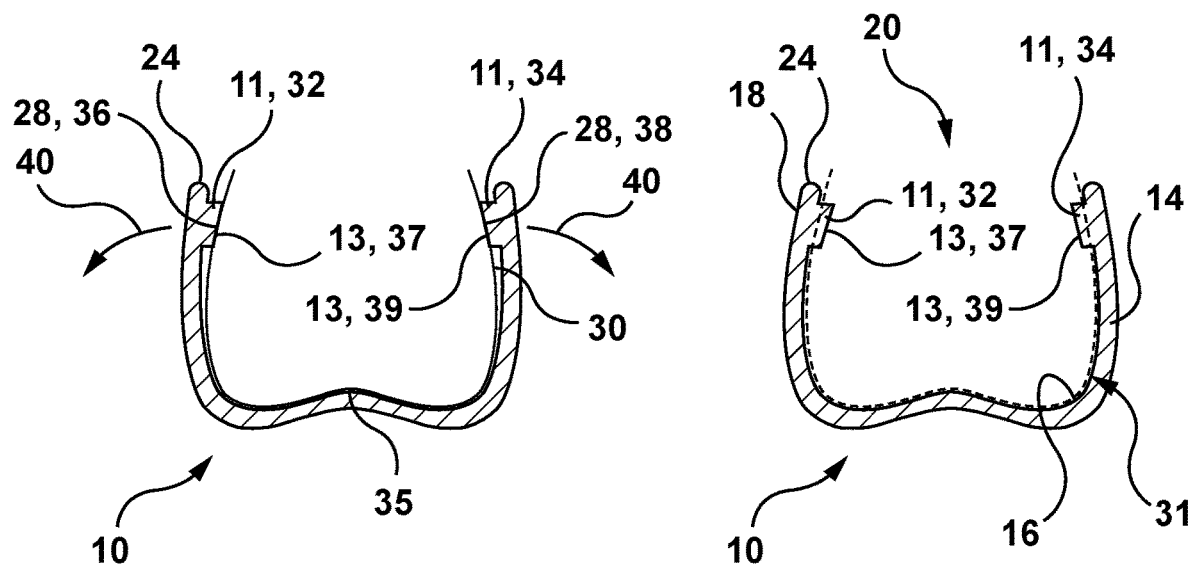
FIG. 2 is a schematic illustration of a cross-section of the orthodontic aligner of FIG. 1 through line 2-2 of FIG. 1, according to certain embodiments of certain aspects of the present technology.
Figure 3:
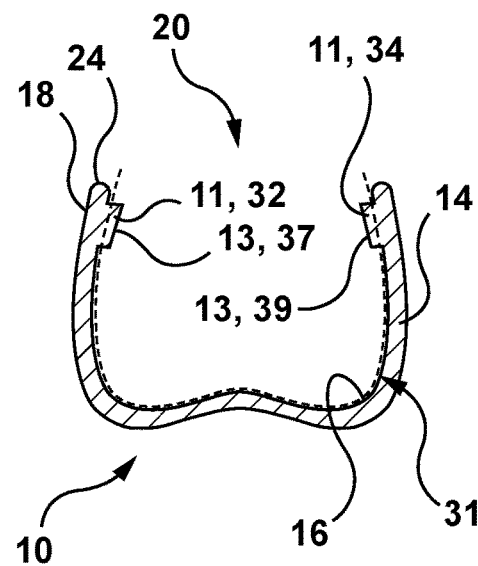
FIG. 3 is a schematic illustration of a cross-section of a digital aligner model representative the orthodontic aligner of FIG. 1, according to embodiments of an aspect of the present technology.

Referring initially to FIGS. 1-3, there is shown an aligner 10 made according to certain aspects and non-limiting embodiments of the present technology. In this embodiment, the illustrated aligner 10 is provided for an upper dental arch 12 (also referred to as "upper arch") of a subject (also referred to as "patient"). The upper arch 12 comprises upper teeth 22 and upper gums having an upper gum line 26. In other embodiments (not shown), the aligner 10 can be provided for a lower dental arch of the subject. In yet other embodiments, aligners 10 are provided for both the lower arch and the upper arch 12.

The aligner 10 comprises an aligner body 14 having an inner surface 16 and an outer surface 18. The inner surface 16 defines a channel 20 for receiving the teeth 22 of the upper arch 12. The inner surface 16 has a shape representative of an outer surface of the teeth 22. In this embodiment, the aligner 10 is arranged to receive all the upper teeth 22 of the upper arch 12 of the subject. At least one edge 24 of the channel 20 is shaped for espousing the gum line 26 of the subject adjacent the teeth 22. The aligner 10 also has fixing blocks 11 projecting from the aligner body 14 to inside the channel 20. The fixing blocks 11 have fixing block coupling surfaces 13 (FIG. 2) respectively shaped for espousing different portions of the outer surface of the teeth 22. The fixing blocks 11 extend between the inner surface 16 and their corresponding fixing block coupling surface 13, defining an interference length. The fixing blocks 11 extend inward the channel 20 by the interference length for interfering with the teeth 22 received thereby. The interference length illustrated has a value of approximately 0.1 mm. It should be noted that the interference length may be configured to a different value for any given fixing block 11. For example, in some embodiments, the interference length of the fixing blocks 11 of a given aligner 10 may vary between 0.05 mm and 2 mm. Also, for any given fixing block 11, the interference length may slightly vary across the fixing block coupling surface 13 of the given fixing block 11.

The aligner 10 is configured for exerting desired loading conditions to the teeth 22 determined via computer software-based simulations designed according to orthodontic treatment objectives. In use, effective loading conditions representative of the desired loading conditions can be exerted to the teeth 22 when the aligner 10 is in a certain desired position relative to teeth 22, establishing an orthodontic relationship therebetween. In FIGS. 1 and 2, the aligner 10 is shown in the orthodontic relationship with respect to the teeth 22. In this relationship, at least an occlusal portion of the outer surface of the teeth 22 espouses a bottom portion of the inner surface 16, the edge 24 espouses the gum line 26 and the fixing block coupling surfaces 13 espouse the portions of the teeth 22, the specifics of which will be further described hereinbelow.

In the orthodontic relationship, the aligner 10 is operatively coupled to the teeth 22 such that the aligner 10 exerts effective loading conditions to the teeth 22, for example via its fixing blocks 11. The aligner 10 is configured such that the fixing blocks 11 interface with tooth-coupling surfaces 28 of the teeth 22. In this embodiment, fixing blocks 11 are arranged so as to interface with each one of the teeth 22. Moreover, some of the teeth 22, for example an upper, distalmost molar of the teeth 22 (i.e., a tooth 30) can interface with more than one fixing block 11. As best seen in FIG. 2, the aligner 10 is operatively coupled to the tooth 30 via two fixing blocks 11, i.e., a first fixing block 32 and second fixing block 34. The first fixing block 32 is disposed on a labial side of the tooth 30. The second fixing block 34 is disposed on a palatal side of the tooth 30.

The first and second fixing blocks 32, 34 respectively form an intimate interface with one of the tooth-coupling surfaces 28 of the tooth 30. The aligner 10 is configured such that in the orthodontic relationship, the fixing blocks 32, 34 are deflected labially and palatally, respectively. The deflection of the fixing blocks 32, 34 away from the tooth 30 (as schematically represented by arrows 40) causes elastic deformation of the aligner body 14 adjacent the fixing blocks 32, 34. The elastic deformation biases the fixing blocks 32, 34 against the tooth-coupling surfaces 28 such that pressure is exerted therebetween.

In FIG. 3, a digital aligner model 235 representative of the aligner 10, absent deformation, and a digital tooth model 31 representative of the tooth 30 are shown to further illustrate the geometrical configuration of the aligner 10 relative to the tooth 30. A method for generating the digital aligner model 235 according to the present technology will be described hereinbelow.

The effective loading conditions include the pressures exerted at the interface of any given fixing block 11 and its corresponding coupling surface 28. Some fixing blocks 11 can be configured to exert pressure resulting in a force of a magnitude that is sufficient for inducing movement of any of the teeth 22. Also, some fixing blocks 11 can be configured to exert pressure resulting in a force of a magnitude that is sufficient for fixedly connecting the aligner 10 relative to the tooth 30 via friction. As will be further described hereinbelow, the fixing blocks 11 can be configured relative to strategically defined coupling surfaces 28 so as to fixedly connect the aligner 10 to the tooth by geometrically hindering displacement therebetween.

It will be appreciated that the aligner 10 may be used in treatments devised for correcting teeth misalignment or malocclusion, including but not limited to one or more of: tooth rotation, tooth intrusion/extrusion, tooth translation, and interdental space management (i.e., closing embrasures and/or creating interproximal contacts, or opening embrasures and/or eliminating interproximal contacts), to name a few.

It will be appreciated that the non-limiting embodiments of the present technology can be applied to different types, shapes, sizes and configurations of orthodontic aligners 10. For example, in certain other embodiments, the channel 20 is arranged to receive some, not all, of the teeth 22 of the lower arch or the upper arch 12. In certain other embodiments, the aligner 10 is arranged with fixing blocks 11 interfacing with some, not all, of the teeth 22.

The aligner 10 is made of a polymer. In certain embodiments, the aligner 10 is made of poly-vinyl chloride (PVC). In certain other embodiments, the aligner 10 is made of polyethylene terephthalate glycol (PETG). In the case of PETG and PVC, the aligner 10 is substantially transparent. In some embodiments, the aligner 10 is made of a material suitable for thermoforming. In some embodiments, the aligner 10 is made of a material suitable for additive manufacturing.

Hereinbelow and with reference to FIGS. 4-6, one embodiment of a system 100 suitable for making the aligner 10 according to aspects and embodiments of the present technology will be described.

It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Figure 4:
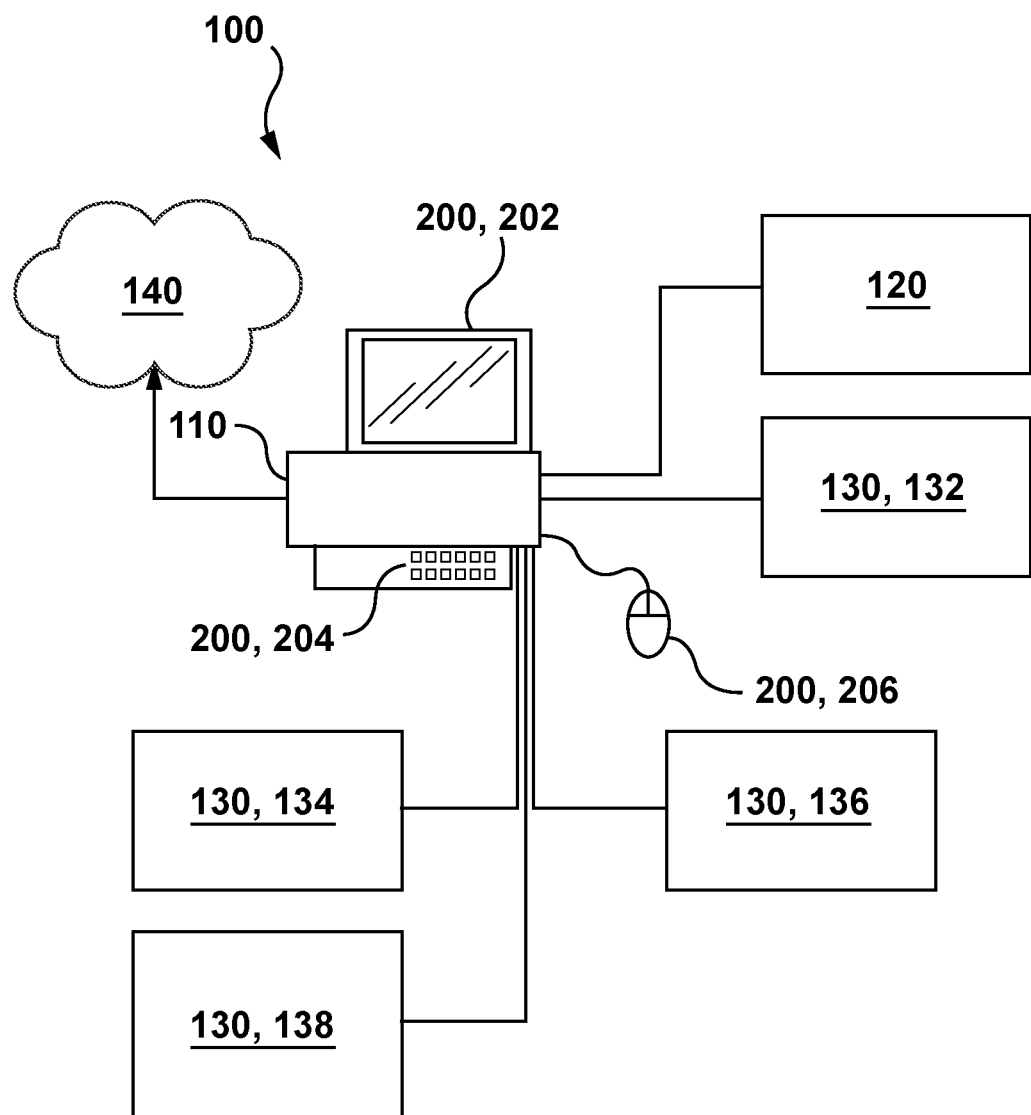
FIG. 4 is a schematic illustration of a system for making an orthodontic aligner, according to embodiments of an aspect of the present technology.

In certain embodiments, the system 100 of FIG. 4 comprises a computer system 110 for implementing embodiments of a method 300 for generating the digital aligner model 235 of the aligner 10 according to aspects of the present technology. The computer system 110 is configured to determine a desired shape of the aligner 10. In some embodiments, the computer system 110 is configured to determine a desired shape of the aligner mold 46 for making the aligner 10 using a thermoforming method.

Accordingly, the system 100 further comprises a manufacturing apparatus 130 for making the aligner 10, operatively communicable with the computer system 110. In certain embodiments, the manufacturing apparatus 130 includes a thermoforming device 132 (FIG. 6) for shaping a precursor aligner 44 into the aligner 10 using the aligner mold 46 by a process which will be described in further detail hereinbelow.

In some embodiments, the manufacturing apparatus 130 further comprises a computer-assisted post-processing device 134, such as a computer numerical control (CNC) milling device or a CNC laser cutting device for further shaping the aligner 10 into a post-processed aligner (not shown). The post-processing of the aligner 10 may include one or both of (i) forming recesses or openings in the aligner body 14, and (ii) forming the edge 24 of the channel 20. In some such embodiments, the post-processing device 134 is operatively connectable to the computer system 110 for receiving operating instructions from the computer system 110 for post-processing the aligner 10. The operating instructions may for example be derived from a digital model indicative of a desired aligner (not shown).

In some embodiments, the manufacturing apparatus 130 further comprises an auxiliary manufacturing device 136 for making the aligner mold 46. The auxiliary manufacturing device 136 is an additive manufacturing device, although it is contemplated that, in other embodiments, a CNC milling device may be used instead. In some embodiments, the additive manufacturing device 136 can be used to make the aligner 10.

In some embodiments, the computer system 110 is configured to receive image data pertaining to the subject or to a given orthodontic treatment (such as a digital model of the aligner 10). In certain embodiments, the computer system 110 is arranged to determine an orthodontic treatment using the image data.

It should be noted that the computer system 110 can be configured for receiving image data from a vast range of devices. Some such devices can be used for capturing and/or processing data pertaining to maxillofacial and/or cranial anatomy of a subject. In certain embodiments, the image data received from such devices is indicative of properties of anatomical structures of the subject, including: teeth, intraoral mucosa, maxilla, mandible, temporomandibular joint, and nerve pathways, among other structures. In some embodiments, at least some of the image data is indicative of properties of external portions of the anatomical structures, for example dimensions of a gingival sulcus, and dimensions of an external portion of a tooth (e.g., a crown of the tooth) extending outwardly of the gingival sulcus.

The image data may include two-dimensional (2D) data and/or tridimensional data (3D). In certain embodiments, the image data includes at least one dataset derived from one or more of the following imaging modalities: computed tomography (CT), radiography, magnetic resonance imaging, ultrasound imaging, nuclear imaging and optical imaging. Any medical imaging modality is included within the scope of the present technology. In certain embodiments, the image data includes 2D data, from which 3D data may be derived, and vice versa.

In certain embodiments, the system 100 optionally further comprises an imaging device 120 operatively coupled to the computer system 110 and which is arranged to provide the image data to the computer system 110.

In certain embodiments, the imaging device 120 includes an image capture sensor for capturing the image data and a processor arranged to receive, and transmit the image data. The processor may be further configured to process the image data to generate digital, 3D models based on the image data, for example. Alternatively, it is contemplated that the processing of the image data may be performed by the computer system 110. The resulting image data received by the computer system 110 is typically structured as a binary file or an ASCII file, may be discretized in various ways (e.g., point clouds, polygonal meshes, pixels, voxels, implicitly defined geometric shapes), and may be formatted in a vast range of file formats (e.g., STL, OBJ, PLY, DICOM, and various software-specific, proprietary formats). Any image data file format is included within the scope of the present technology.

In certain embodiments, the image data can be provided to the computer system 110 in a different way, such as via a storage device (not shown) or via a communication network (not shown).

In certain embodiments, the imaging device 120 is an intraoral scanner for direct digitization of the upper arch 12 and any other relevant intraoral anatomy. The computer system 110 is connected to the imaging device 120 for receiving the image data including a digital, 3D surface model of the subject's intraoral anatomy.

Alternatively, as contemplated in other embodiments, the imaging device 120 may instead be a desktop scanner (not shown) for indirect digitization of the intraoral anatomy via a replica (i.e., a dental model). In some such embodiments, the replica is obtainable via a dental impression (i.e., a negative mold) made of a material (such as polyvinylsiloxane) having been imprinted with the shape of the intraoral anatomy it has been applied to. In the dental impression, a flowable mixture (i.e., dental stone powder mixed with a liquid in certain proportions) may be flowed such that it may, once dried and hardened, form the replica. The replica may then be retrieved from the dental impression and digitized by the desktop scanner to generate the digital surface model. Alternatively, in other embodiments, the digital surface model may be generated via digitizing the dental impression.

In certain embodiments, the system 100 further includes a robotic system 138 arranged relative to the thermoforming device 132, for handling one or more of the aligner mold 46, the precursor aligner 44, and the aligner 10.

In certain embodiments, the computer system 110 is connectable to one or more of the imaging device 120, the thermoforming device 132, the post-processing device 134, the auxiliary manufacturing device 136 and the robotic system 138 via a communication network. In some embodiments, the communication network is the Internet and/or an Intranet. Multiple embodiments of the communication network may be envisioned and will become apparent to the person skilled in the art of the present technology.

Figure 5:
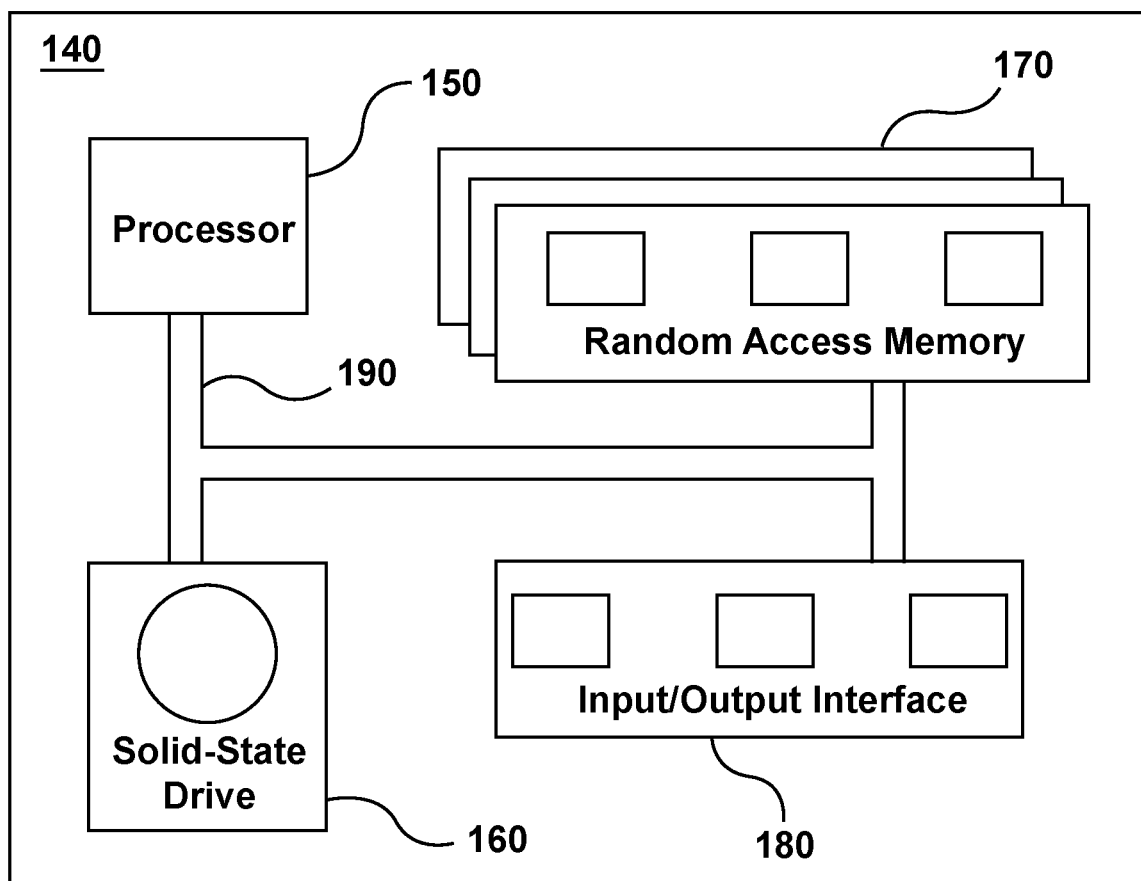
FIG. 5 is a computer system of the system of FIG. 4, according to certain embodiments of the present technology.

Turning now to FIG. 5, certain embodiments of the computer system 110 have a computing environment 140 as illustrated schematically. The computing environment 140 comprises various hardware components including one or more single or multi-core processors collectively represented by a processor 150, a hard drive 160 in this case being a solid-state drive 160, a random access memory 170 and an input/output interface 180. Communication between the various components of the computing environment 140 may be enabled by one or more internal and/or external buses 190 (e.g. a PCI bus, universal serial bus, IEEE 1394 "Firewire"

bus, SCSI bus, Serial-ATA bus, ARINC bus, etc.), to which the various hardware components are electronically coupled.

The random access memory 170 is configured in any known manner and arranged to store one or more of: set-up data, subject data, subject medical records of one or more subjects, digital anatomy representation data of the one or more of the subjects, and orthodontic treatment data. The orthodontic treatment data comprises, for example, material properties (e.g. chemical properties, mechanical properties, optical properties) of different materials usable for making the aligner 10, number of treatment stages, information on the aligners to be used in the treatment stages, durations of the treatment stages, desired total treatment duration, and the like. Other data relating to any type of orthodontic treatment or aligner 10 can also be included in the random access memory 170. In some embodiments, the above-mentioned data may also be stored in the solid-state drive 160 in a manner that is suitable for being loaded into the random access memory 170.

The input/output interface 180 allows enabling networking capabilities such as wire or wireless access. As an example, the input/output interface 180 comprises a networking interface such as, but not limited to, a network port, a network socket, a network interface controller and the like. Multiple examples of how the networking interface may be implemented will become apparent to the person skilled in the art of the present technology.

For example, but without being limiting, the networking interface 180 may implement specific physical layer and data link layer standard such as Ethernet™, Fibre Channel, Wi-Fi™ or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 160 stores program instructions suitable for being loaded into the random access memory 170 and executed by the processor 150 for executing the methods 300 according to certain aspects and embodiments of the present technology. For example, the program instructions may be part of a library of instructions and/or part of a software application.

In this embodiment, the computing environment 140 is implemented in a generic computer system which is a conventional computer (i.e. an "off the shelf" generic computer system). The generic computer system is a desktop computer/personal computer, but may also be any other type of electronic device such as, but not limited to, a laptop, a mobile device, a smart phone, a tablet device, or a server.

In other embodiments, the computing environment 140 is implemented in a device specifically dedicated to the implementation of the present technology. For example, the computing environment 140 is implemented in an electronic device such as, but not limited to, a desktop computer/personal computer, a laptop, a mobile device, a smart phone, a tablet device, a server, specifically designed for making aligners. The electronic device may also be dedicated to operating other devices, such as one or more of the imaging device 120, the thermoforming device 132, the post-processing device 134, the auxiliary manufacturing device 136 and the robotic system 138.

In some embodiments, the computer system 110 is connected to one or more of the imaging device 120, the thermoforming device 132, the post-processing device 134 and the auxiliary manufacturing device 136. In some alternative embodiments, the computer system 110 or the computing environment 140 is implemented, at least partially, on one or more of the imaging device 120, the thermoforming device 132, the post-processing device 134, the auxiliary manufacturing device 136 and the robotic system 138. In some alternative embodiments, the computer system 110 or the computing environment 140 may be hosted, at least partially, on a server. In some alternative embodiments, the computer system 110 or the computing environment 140 may be partially or totally virtualized through cloud architecture.

Referring back to FIG. 4, the computer system 110 has at least one interface device 200 for providing an input or an output to a user of the system 100. In the embodiment of FIG. 4, the interface device 200 includes a screen 202 for providing a visual output to the user of the system 100, the visual output including one or more images pertaining to the manufacturing of the aligner, information relating to the thermoforming device, orthodontic treatment plan, including images of: photos of the lower arch and/or the upper arch 12, a digital model of the lower arch and/or the upper arch 12 in a current teeth configuration, a digital model of the lower arch and/or the upper arch 12 in a desired teeth configuration, a digital model of a desired aligner, a digital model of the aligner mold 46, and a digital model of the precursor aligner 44.

Other data related to the orthodontic treatment plan may also be included in the visual output, for example measurements (e.g., distances between anatomical landmarks, angulation between teeth), geometry (e.g., an occlusal plane) and identifiers (e.g., teeth site numbers, subject identifier). The visual output may also include visual data pertaining to operation to any one of the imaging device 120, the thermoforming device 132, the post-processing device 134, the auxiliary manufacturing device 136 and the robotic system 138. The interface device 200 also includes a keyboard 204 and a mouse 206 for receiving input from the user of the system 100. The interface device 200 may include, in certain embodiments, other devices for providing an input to the computer system 110 such as, without limitation, a USB port, a microphone, a camera or the like.

Users of the computer system 110, in certain embodiments, are practitioners and staff of a given clinic. The computer system 110 may also be connected to clinical practice management software which could be used for patient appointment scheduling, inventory management (e.g., for managing stocks of precursor aligners and/or stocks of material for making aligners and aligner molds) and other tasks based on the given orthodontic treatment and/or in view of other activities and needs of the clinic. It is also contemplated that the computer system 110 may also be arranged for being used remotely, such as by users of other clinics, for example via server or cloud environment.

In some embodiments, the computing environment 140 is distributed amongst multiple systems, such as one or more of the imaging device 120, the thermoforming device 132, the post-processing device 134, the auxiliary manufacturing device 136, the robotic system 138 and/or the server or cloud environment. In some embodiments, the computing environment 140 may be at least partially implemented in another system, as a sub-system for example. In some embodiments, the computer system 110 and the computing environment 140 may be geographically distributed.

As persons skilled in the art of the present technology may appreciate, multiple variations as to how the computing environment 140 is implemented may be envisioned without departing from the scope of the present technology.

Figure 6:
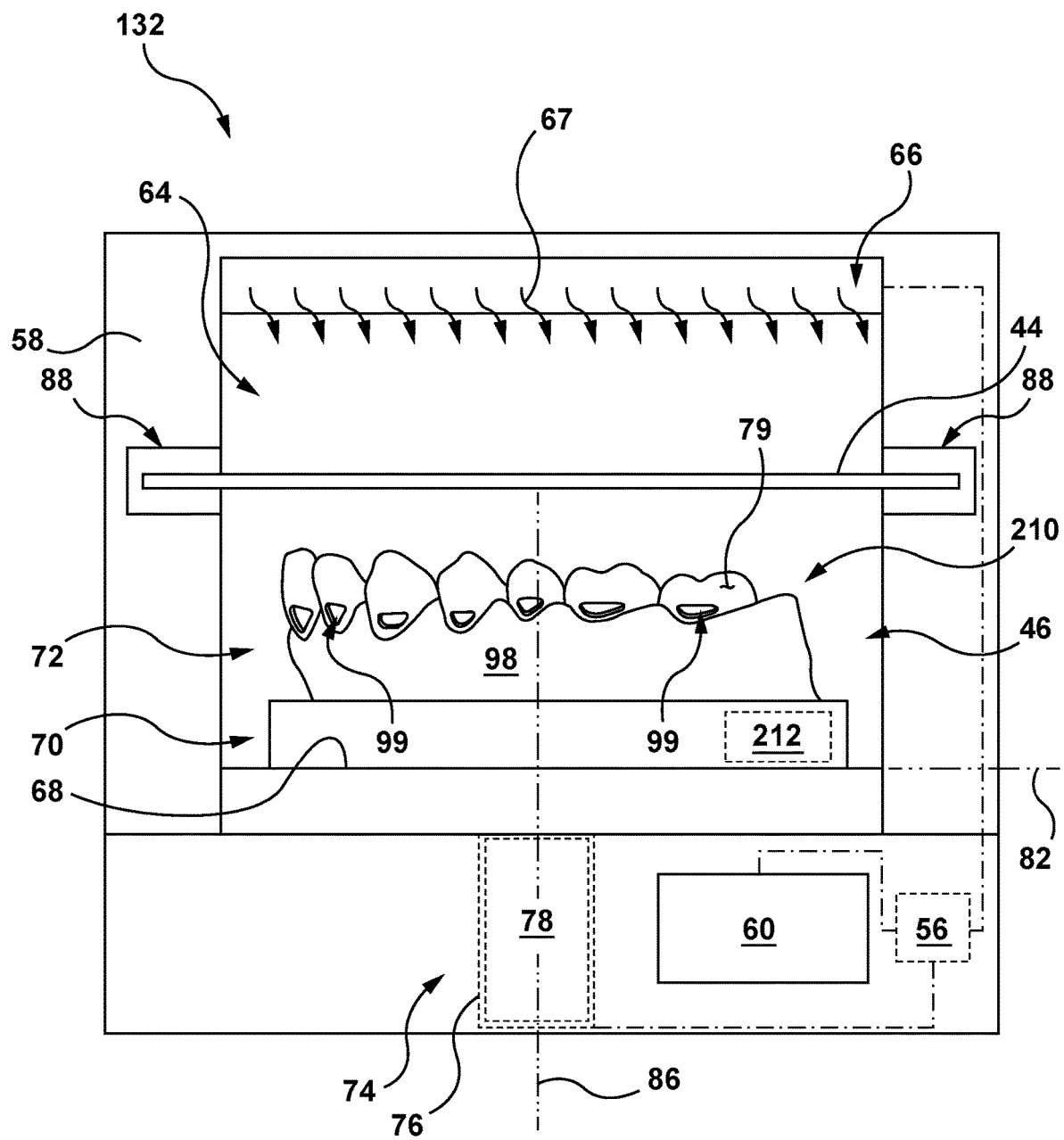
FIG. 6 is a thermoforming device, a precursor aligner and an aligner mold of the system of FIG. 4, according to certain embodiments of the present technology.
Figure 7:
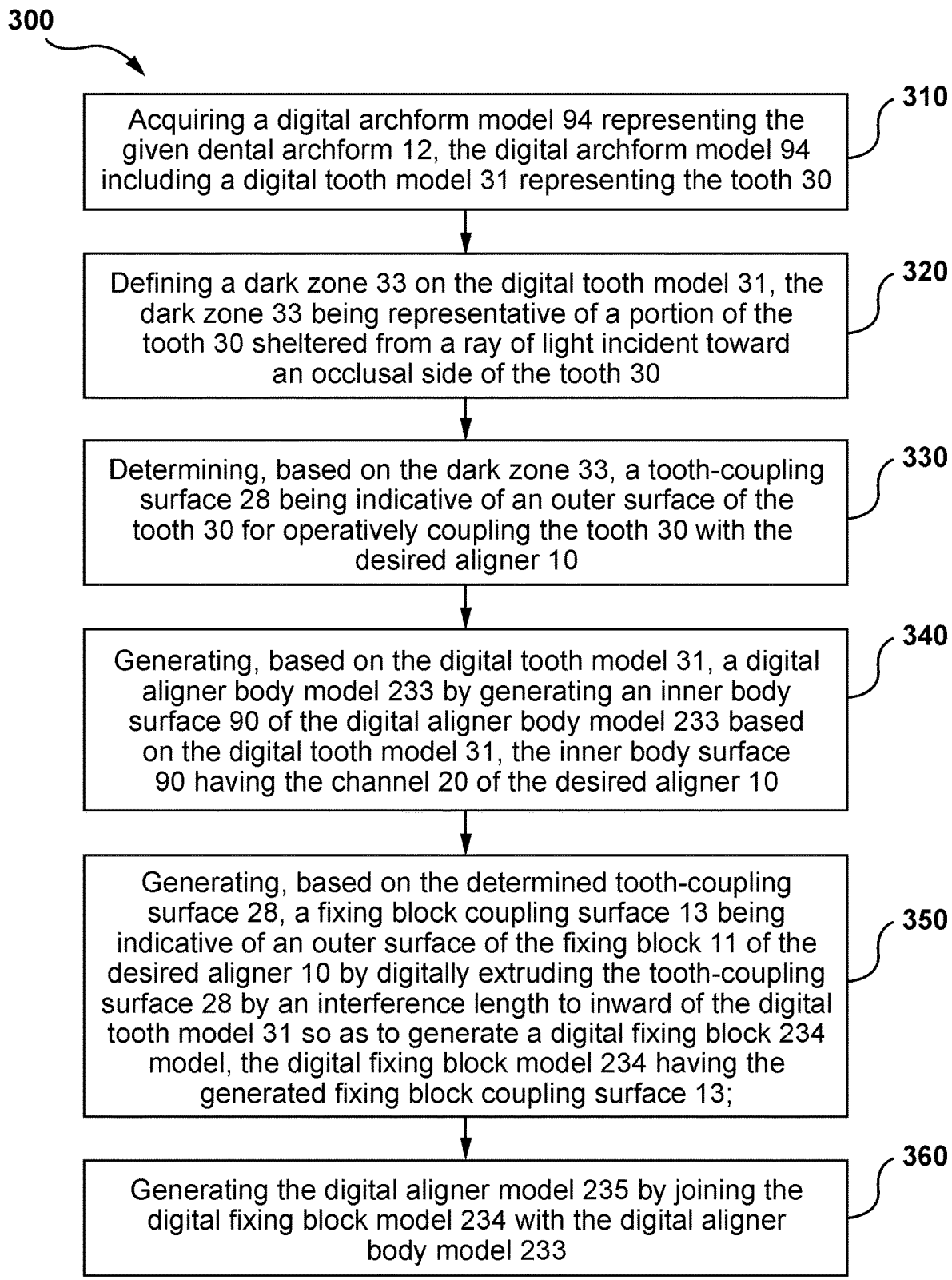
FIG. 7 illustrates method steps for making the orthodontic aligner, according to certain embodiments of another aspect of the present technology.

Turning now to FIG. 6, the aligner mold 46 and the thermoforming device 132 are schematically represented according to certain embodiments of the present technology. The aligner mold 46 has a base portion 70 and an anatomic portion 72. The base portion 70 comprises a code-bearing portion 212 bearing a code indicative of the aligner mold 46. It is contemplated that the code-bearing portion 212 could be disposed elsewhere on the aligner mold 46. The anatomic portion 72 is adjacent the base portion 70 and comprises a dentition surface 96 representing teeth 22 of the subject (for example a portion 79 of the dentition surface 96 representing the given tooth 30) disposed in a given configuration as determined per the given orthodontic treatment plan.

Recessed regions 99 (FIGS. 6, 17) are defined inward of the dentition surface 96. As will be further described hereinbelow, the recessed regions 99 have shapes representative of shapes of the fixing blocks 11. The anatomic portion 72 also comprises a mucosa surface 98 representative of the gingiva and gum line 26 of the subject. The mucosa surface 98 also includes a shape representative of vestibular tissue and/or oral cavity-lining tissue, although it does not have to be the case. The dentition and mucosa surfaces 96, 98 together are inclusive of a shaping portion 210 of the aligner mold 46 to be used for shaping the precursor aligner 44.

The thermoforming device 132 is arranged to receive the aligner mold 46 and the precursor aligner 44, and to shape the precursor aligner 44 onto the aligner mold 46 during a thermoforming operation, in which heat and pressure imparted to the precursor aligner 44 during shaping are controlled.

The thermoforming device 132 has a device body 58 housing a control unit 56. The control unit 56 is arranged to receive a signal indicative of operating instructions from the computer system 110. The control unit 56 can also be arranged to receive a signal indicative of operating instructions from a user interface 60 connected to the device body 58. Based on the signal, the control unit 56 selectively causes the thermoforming device 132 to operate according to one or more given operating parameters (e.g., thermoforming temperature, thermoforming pressure) values.

The device body 58 defines a chamber 64 sized for receiving the aligner mold 46 and the precursor aligner 44. The chamber 64 has a platform 68 on which the aligner mold 46 is be supported. The thermoforming device 132 also includes a heating element 66 for generating heat 67 inside the chamber 64. Moreover, the heating element 66 is operable for selectively adjusting its heating temperature based on a desired thermoforming temperature value. The control unit 56 is electronically connected to the heating element 66 for selectively causing the heating temperature to be adjusted based on the desired thermoforming temperature value.

Figure 18:
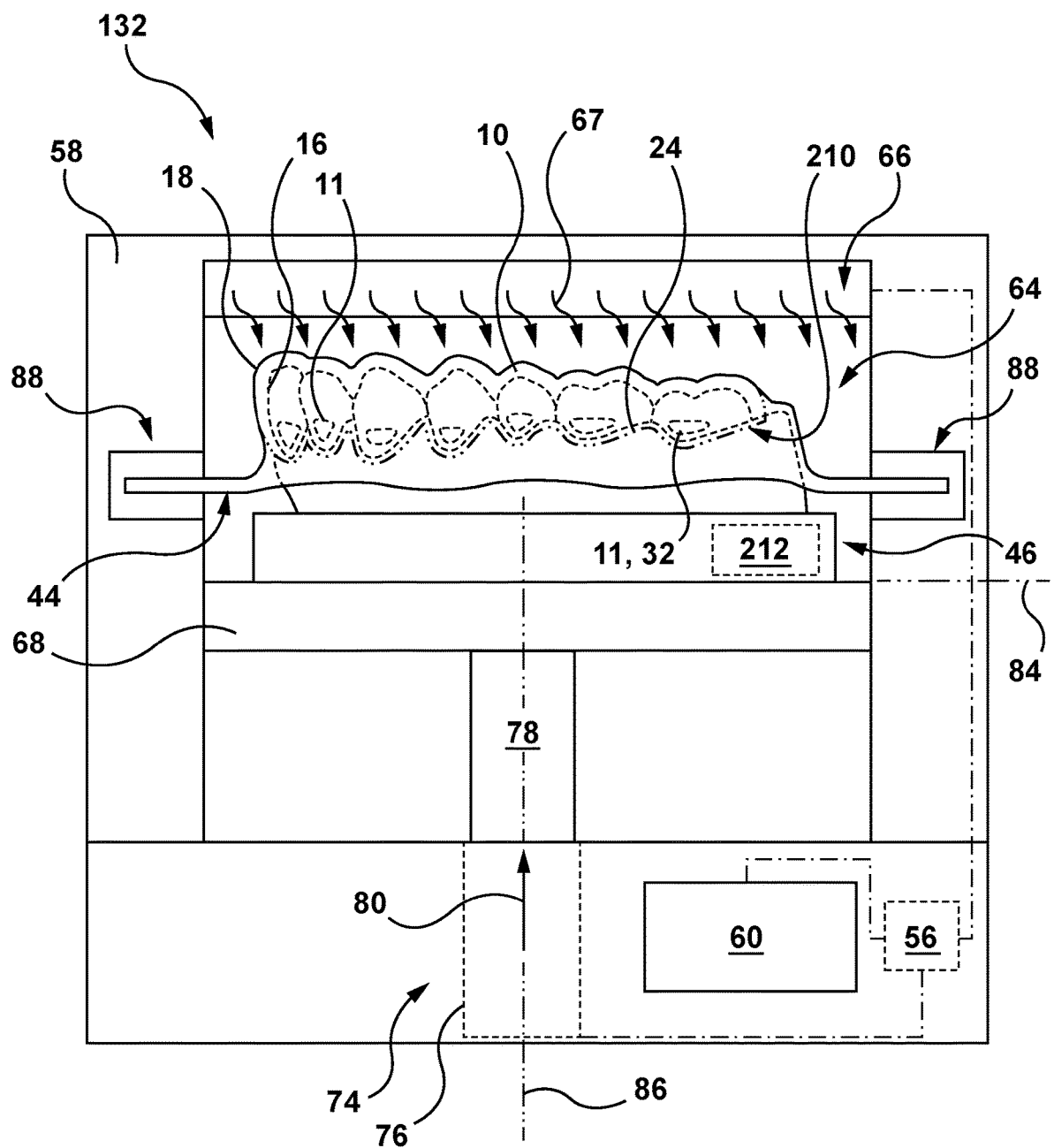
FIG. 18 is the thermoforming device, the precursor aligner and the aligner mold of FIG. 6, with the precursor aligner shown deformed onto the aligner mold, used during the method of FIG. 7 according to certain embodiments of the present technology.

The platform 68 and the heating element 66 are configured relative to one another such that when the base portion 70 of the aligner mold 46 is disposed on the platform 68, the anatomic portion 72 of the aligner mold 46 faces the heating element 66. The thermoforming device 132 includes a pneumatic actuator 74 in fluid connection with a compressor (not shown). The pneumatic actuator has a fixed portion 76 connected to the device body 58 and a movable portion 78 connected to the platform 68. The control unit 56 is electronically connected to the pneumatic actuator 74 for selectively causing the movable portion 78 to be moved by the pushing force 80, the pushing force 80 being commensurate to the selected desired thermoforming pressure value. The pneumatic actuator 74 is operatively connected to the platform 68, via the movable portion 78, for moving the platform 68 along an axis 86 relative to the chamber 64 from a first position 82 away from the heating element 66 (FIG. 6) to a second position 84 in which the platform 68 is closest to the heating element 66 (FIG. 18). Also, it should be noted that the heating element 66 is configured relative to the chamber 64 so as to remain spaced from the platform 68 when the platform 68 is in either of the first 82 or the second 84 positions. In other embodiments, other types of actuators, such as hydraulic and electric actuators, are contemplated as alternatives to the pneumatic actuator 74.

The thermoforming device 132 also includes a securing mechanism 88 (not shown in detail) configured for retaining a position of the precursor aligner 44 in the chamber 64 during the thermoforming operation.

Method

With reference to FIGS. 7 to 18, in certain embodiments the computer system 110 is configured to execute the method 300 for generating a digital model of the aligner 10. Embodiments of the method 300 will now be described in further detail below.

STEP 310: Acquiring a Digital Archform Model Representing the Given Dental Archform, the Digital Archform Model Including a Digital Tooth Model Representing the Tooth Referring to FIG. 7, the method 300 commences, in certain embodiments, in Step 310 by acquiring a digital archform model 94 representing a given dental archform, for example, the upper dental arch 12 (FIG. 1). The digital archform model 94 is also known as a three-dimensional representation, a three-dimensional digital model or a 3D map of the given dental archform 12.

It should be understood that, in accordance with a given orthodontic treatment plan specific to a given subject, the given dental archform 12 and its corresponding aligner 10 may relate to either one of the upper dental arch 12 or the lower dental arch (not shown) of the given subject. The given orthodontic treatment plan may also provide applying another aligner to the other archform of the subject opposite the given dental archform 12. It should be noted that certain methods of determining such orthodontic treatment plans is further described in U.S. Ser. No. 16/132,995, the contents of which are hereby incorporated by reference.

In this embodiment, the given dental archform 12 relates to the upper dental arch 12 of the subject. The digital archform model 94 includes a digital tooth model 31 representing the given tooth 30.

STEP 320: Defining a Dark Zone on the Digital Tooth Model, the Dark Zone being Representative of a Portion of the Tooth Sheltered from a Ray of Light Incident Toward an Occlusal Side of the Tooth The method 300 continues, in Step 320, by defining a dark zone 33 on the digital tooth model 31. It should be noted that although dark zones can be defined with respect to any of the teeth 22, the method 300 and the dark zone 33 will be mostly described with respect to the tooth 30 for brevity.

The dark zone 33 represents a portion of the tooth 30 located adjacent an overhanging portion of the tooth 30. It will be appreciated that the dark zone 33 conceptually represents a portion of the tooth 30 on which a shadow is cast. The tooth 30 is exposed to a ray of light incident a side of the overhanging portion of the tooth 30 opposite the dark zone 33 such that the dark zone 33 is sheltered from the ray of light, thereby casting the shadow. It should also be noted that the ray of light is analogous to a coupling path 218 (FIG. 10).

The coupling path 218 represents a theoretical linear path along which the aligner 10 can be either applied (i.e., coupled) to the tooth 30 or drawn (i.e., removed) from the tooth 30. The overhanging portion of the tooth 30 faces away from the coupling path 218 and extends away from the dark zone 33 as it extends toward an occlusal surface 35 of the tooth 30 facing the coupling path 218. The dark zone 33 represents a portion of the tooth 30 which can be used for configuring the fixing blocks 11 of the aligner 10 to interface with the tooth 30 within the dark zone 33 so as to geometrically hinder displacement of the aligner 10 relative to the tooth 30 along the coupling path 218. In some embodiments, the dark zone 33 is ring-shaped and surrounds the tooth 30. Data representative of the dark zone 33 can be stored by the computer system 110, for example as a digital dark zone model, so as to be used in the method 300.

Figure 10:
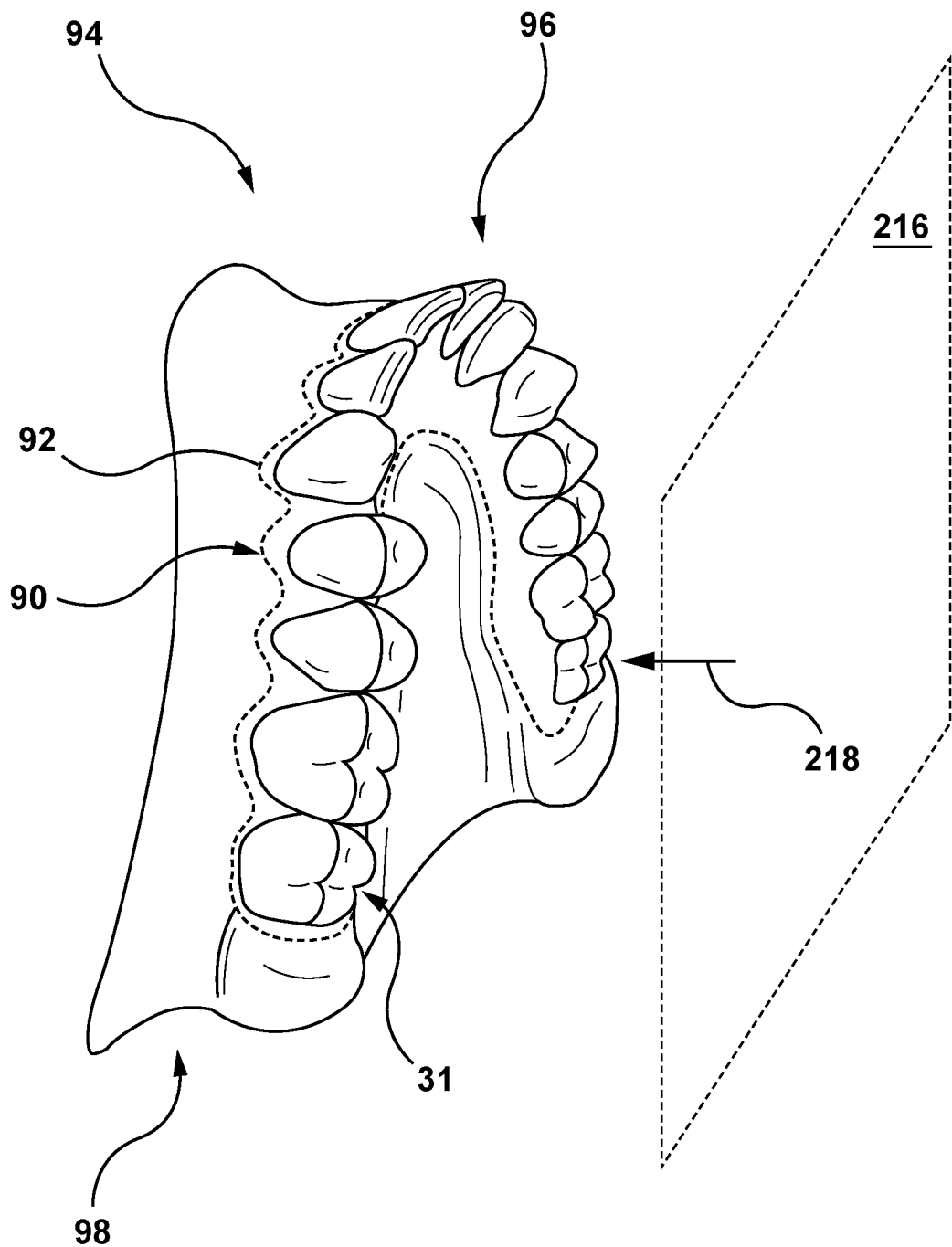
FIG. 10 illustrates a digital model of an upper arch used during the method of FIG. 7, according to certain embodiments of the present technology.
Figure 11:
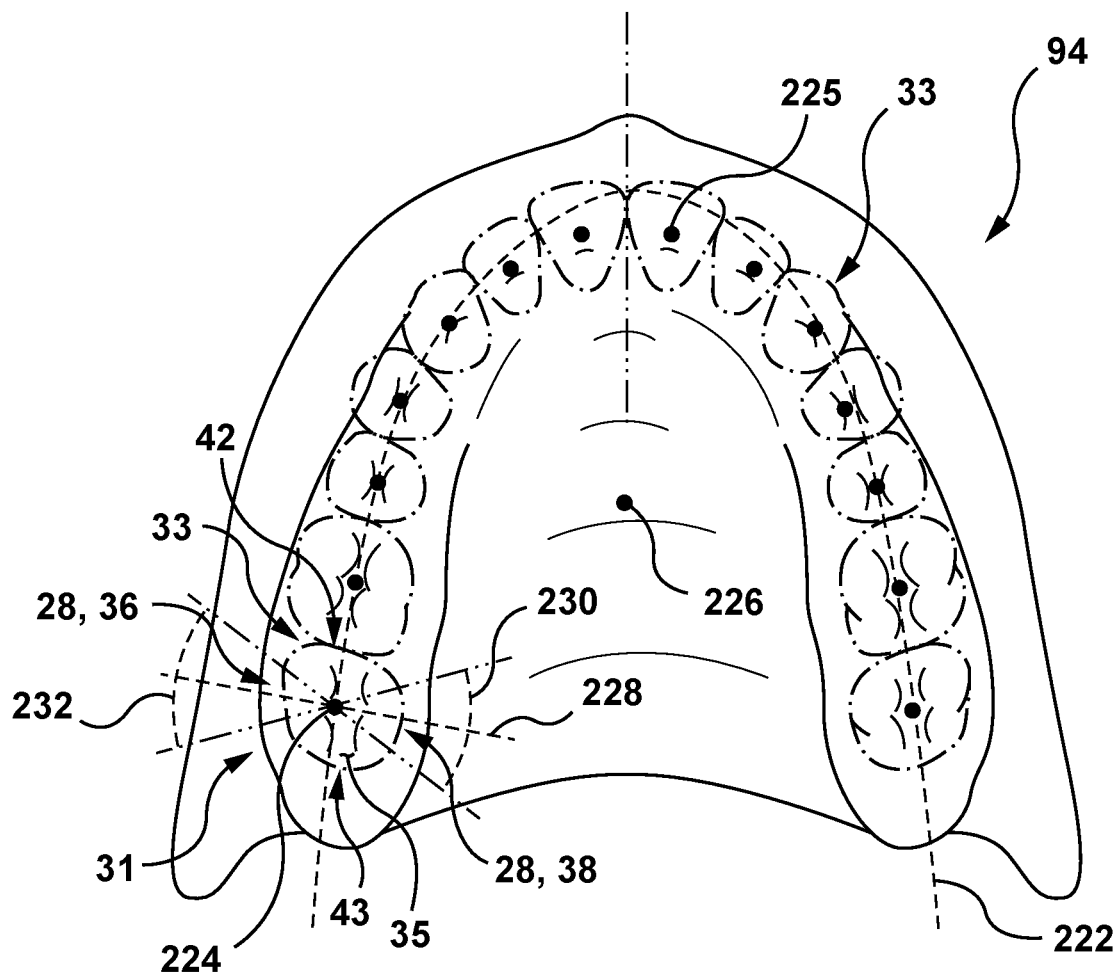
FIG. 11 illustrates an occlusal surface of the digital model of the upper arch of FIG. 10, used during the method of FIG. 7 according to certain embodiments of the present technology.

In some embodiments, defining the dark zone 33 with respect to the tooth 30 comprises orienting the digital archform model 94 relative to a digital ray of light in a desired orientation so as to cause a portion of the digital tooth model 31 to be sheltered from the digital ray of light (FIGS. 10 and 11). In some embodiments, the dark zone 33 can be defined digitally by displaying the digital tooth model 31 via the computer system 110 in a given orientation in which portions of the digital tooth model 31 are hidden from view and represent the dark zone 33, the given orientation defining the coupling path 218.

In some such embodiments, the desired orientation of the digital ray of light is pre-determined. For example, the desired orientation may be the coupling path 218 representing a vector normal to a plane 216. The plane 216 can be, for example, pre-determined by the processor 150 via a best-fit algorithm arranged to define the plane 216 based on a set of 3D coordinates representative of anatomical landmarks of the digital archform model 94. The plane 216 is positioned so as to minimize a normal quadratic distance between the plane 216 and the set 3D coordinates. In some embodiments, the plane 216 is representative of an occlusal plane 216 of the subject.

STEP 330: Determining, Based on the Dark Zone, a Tooth-Coupling Surface being Indicative of an Outer Surface of the Tooth for Operatively Coupling the Tooth with the Desired Aligner The method continues, in Step 330, by defining the tooth-coupling surfaces 28 within the dark zone 33. Various portions of any dark zone 33 defined with respect to the tooth 30 may be used for coupling the aligner 10 with the tooth 30. In some embodiments, the method 300 comprises strategically selecting portions of the dark zones 33 to define the tooth-coupling surfaces 28 via which the aligner 10 may be coupled to the tooth 30. Strategic selection of the portions of the dark zones 33 may be performed manually by a user via the computer system 110. Also, in some embodiments, the strategic selection of the portions of the dark zones 33 may be performed automatically via the processor 150, for example based on the desired loading conditions.

Figure 13:
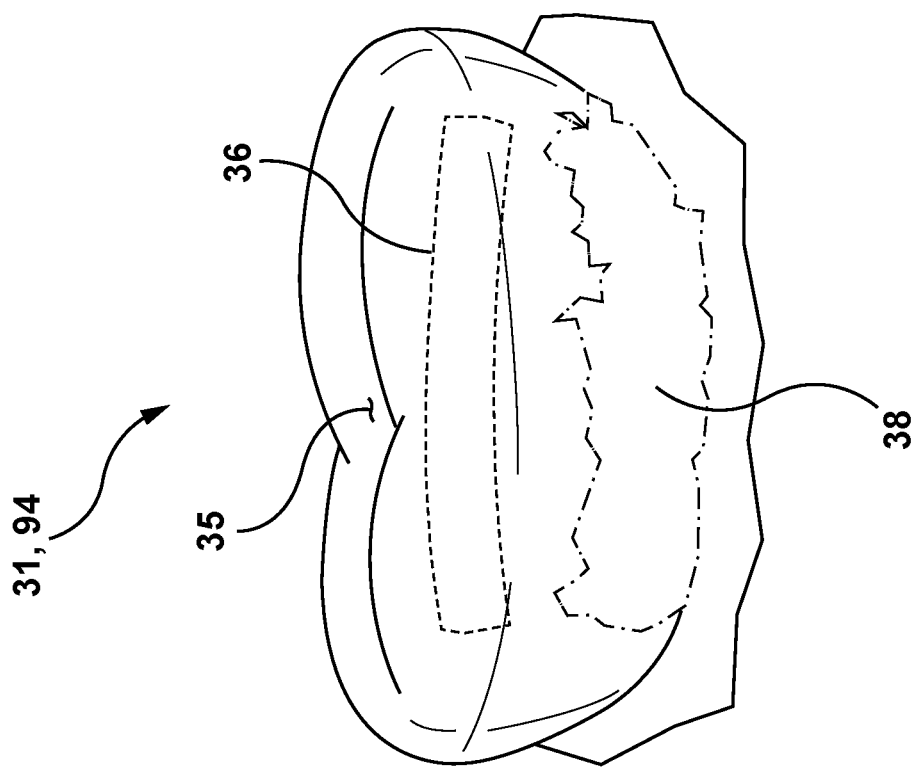
FIG. 13 illustrates a tooth-coupling surface of the dark zone of FIG. 12, used during the method of FIG. 7 according to certain embodiments of the present technology.
Figure 12:
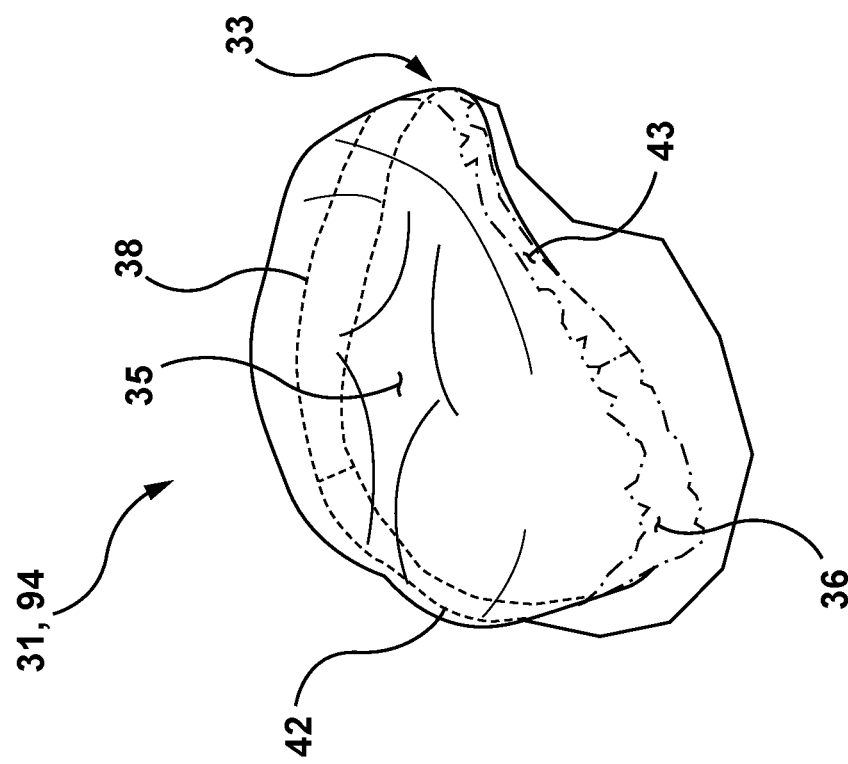
FIG. 12 illustrates a dark zone of the digital model of the upper arch of FIG. 10, used during the method of FIG. 7 according to certain embodiments of the present technology.

As seen in FIG. 12, a mesial surface 42 and a distal surface 43 both being portions of the dark zone 33 may be excluded from the selection. Remainder portions, in this case a labial portion and a palatal portion, respectively define a labial surface 36 and a palatal surface 38, each representing one of the tooth-coupling surfaces 28. Subtracting the mesial and distal surfaces 42, 43 from the dark zone 33 defines a remainder surface based on which the labial and palatal tooth-coupling surfaces 36, 38 can be determined. As shown in FIG. 13, in some embodiments, the remainder surface consists solely in the labial and palatal tooth-coupling surfaces 36, 38.

Figure 14:
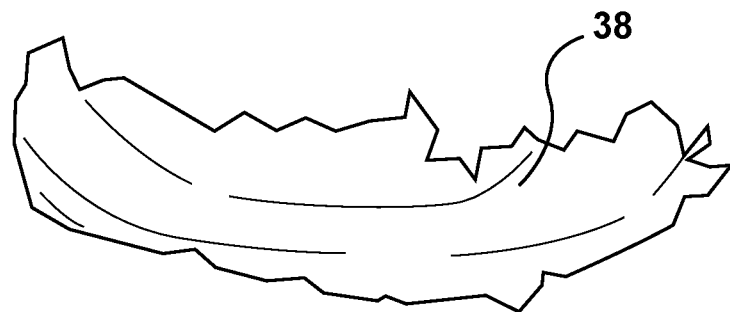
FIG. 14 illustrates the tooth-coupling surface of FIG. 13, shown isolated from the digital model of the upper arch of FIG. 7, used during the method of FIG. 7 according to certain embodiments of the present technology.
Figure 15:
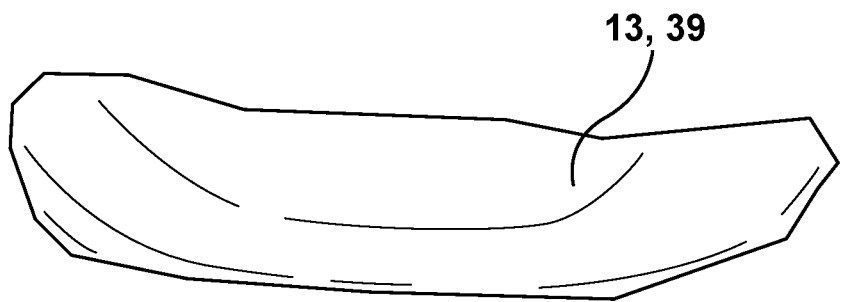
FIG. 15 illustrates a fixing-block coupling surface, used during the method of FIG. 7 according to certain embodiments of the present technology.

In some embodiments, determining the tooth-coupling surfaces 28 includes normalizing the tooth-coupling surface 28 to define its corresponding fixing-block coupling surfaces 13. As seen in FIGS. 13 and 14, showing the palatal tooth-coupling surface 38 in more detail, a contour and a topology of the tooth-coupling surface 28 can be irregular. The processor 150 is arranged for normalizing (i.e., smoothing) copies of the surfaces representing the tooth-coupling surfaces 28 (e.g., the labial and palatal tooth-coupling surfaces 36, 38) via a smoothing algorithm (e.g., a Laplacian smoothing algorithm) so as to define the fixing-block coupling surfaces 13. As shown in FIGS. 14 and 15, a smoothed copy of the palatal tooth-coupling surface 38 defines a palatal fixing-block coupling surface 39. Similarly, a smoothed copy (not shown) of the labial tooth-coupling surface 36 defines a labial fixing-block coupling surface 37 (FIG. 3).

In some embodiments, determining the mesial and distal surfaces 42, 43 comprises determining the occlusal surface 35, the labial tooth-coupling surface 36 and the palatal tooth-coupling surface 38 using the digital tooth model 31. The mesial surface 42 and the distal surface 43 respectively form portions of the digital tooth model 31 excluding the occlusal, labial and palatal surfaces 35, 36, 38.

In some such embodiments, the occlusal surface 35 represents an occlusal side of the tooth 30. The palatal tooth-coupling surface 38 is oriented generally orthogonally relative to the occlusal surface 35 and faces inwardly of an arch curve 222 of the digital archform model 94. The arch curve 222 extends distally on either sides of a midline 223 of the digital archform model 94. The labial tooth-coupling surface 36 is oriented generally orthogonally relative to the occlusal surface 35 and faces outwardly of the arch curve 222.

Referring to FIG. 11, in some such embodiments, determining the mesial surface 42 and the distal surface 43 comprises determining an anatomical center point 224 of the digital tooth model 31. The arch curve 222 can be determined based on a plurality of points defined relative to the digital archform model 94. In some embodiments, the points include the anatomical center point 224, and can include other anatomical center points 225 determined on other digital teeth models of the digital archform model 94. The curve 222 can align with only some, not all, of the anatomical center points 224, 225.

In some such embodiments, determining the mesial surface 42 and the distal surface 43 comprises determining a geometrical curve center point 226 being equidistant from each one of the plurality of points. In some such embodiments, the anatomical center point 224 of the digital tooth model 31 is intermediate distal and mesial points (not shown) of the digital tooth model 31. The distal point and the mesial point define a distal-mesial tooth axis (not shown). A palatal-labial tooth axis 228 is defined through the anatomical center point 224 orthogonally to the distal-mesial tooth axis. The palatal 38 and labial 36 surfaces are respectively intercepted (i.e., filtered out of the dark zone 33) by palatal 230 and labial 232 angular ranges. The angular ranges 230, 232 originate from the anatomical center point 224 of the digital tooth model 31 and are defined relative to the palatal-labial tooth axis 228. The palatal surface 38 is distinguishable from the labial surface 36 due to being oriented generally toward the geometrical curve center point 226. In some embodiments, the processor 150 is arranged for distinguishing the palatal surface 38 from the labial surface 36, and vice versa.

STEP 340: Generating, Based on the Digital Tooth Model, a Digital Aligner Body Model by Generating an Inner Body Surface of the Digital Aligner Body Model Based on the Digital Tooth Model, the Inner Body Surface Having the Channel of the Desired Aligner In Step 340, the method continues by generating a digital aligner body model 233 (FIG. 3) representing the aligner body 14. The digital aligner body model 233 is a digital volume extending between a digital inner body surface 90 (FIG. 10) and a digital outer body surface 91. The digital inner body surface 90 represents the inner surface 16, and the digital outer body surface 91 represents the outer surface 18. In some embodiments, as illustrated in FIG. 10, the digital aligner body model 233 is generated by segmenting, along a boundary 92, the digital inner body surface 90 being a portion of the digital archform model 94 including the digital tooth model 31. The boundary 92 represents the edge 24 of the aligner 10, and can either be pre-determined or determined by the user via the computer system 110. In some embodiments, the digital inner body surface 90 is a digital surface generated by offsetting the portion of the digital archform model 94.

In some embodiments, the method 300 further comprises (Step 342) receiving a treatment plan outlining a desired shape of the aligner body 14. For example, the treatment plan may provide the digital inner body surface 90 and a desired thickness value for the aligner body 14. The digital aligner body model 233 can be generated by defining a volume extending outwardly of the digital inner body surface 90 by a distance generally equivalent to the desired thickness value.

Figure 16:
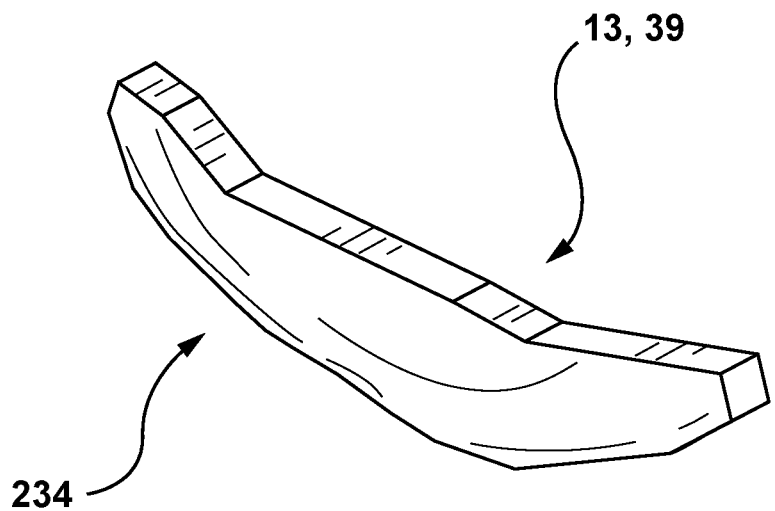
FIG. 16 illustrates a digital fixing block model, used during the method of FIG. 7 according to certain embodiments of the present technology.

STEP 350: Generating, Based on the Determined Tooth-Coupling Surface, a Fixing Block Coupling Surface being Indicative of an Outer Surface of the Fixing Block of the Desired Aligner by Digitally Extruding the Tooth-Coupling Surface by an Interference Length to Inward of the Digital Tooth Model so as to Generate a Digital Fixing Block Model, the Digital Fixing Block Model Having the Generated Fixing Block Coupling Surface;

Turning now to FIG. 16, the method 300 continues, in Step 350, with a digital extrusion operation being performed by the processor 150 for generating digital fixing block models representative of the fixing blocks 11. For example, a copy of the palatal tooth-coupling surface 38 is digitally extruded labially and away from the digital inner body surface 90 by a distance generally equivalent to the interference length, thereby generating a digital palatal fixing block model 234 representative of the palatal fixing block 34. The digital palatal fixing block model 234 extends from the digital inner body surface 90 to inside the digital tooth model 31. In other embodiments, the interference length is pre-determined. In some embodiments, the digital extrusion operation further comprises extruding a copy of the tooth-coupling surfaces 28 such that the resulting digital fixing block models extend to inside the digital tooth model 31 and to inside the digital aligner body model.

In some embodiments, the method comprises determining the interference length of the fixing blocks 11 such that when the aligner 10 is operatively coupled to the tooth 30, the aligner 10 exerts enough pressure on the tooth 30 to maintain the orthodontic relationship therebetween (Step 352). In some such embodiments, the interference length is defined as a function of a surface area value and/or of the desired loading conditions.

Figure 17:
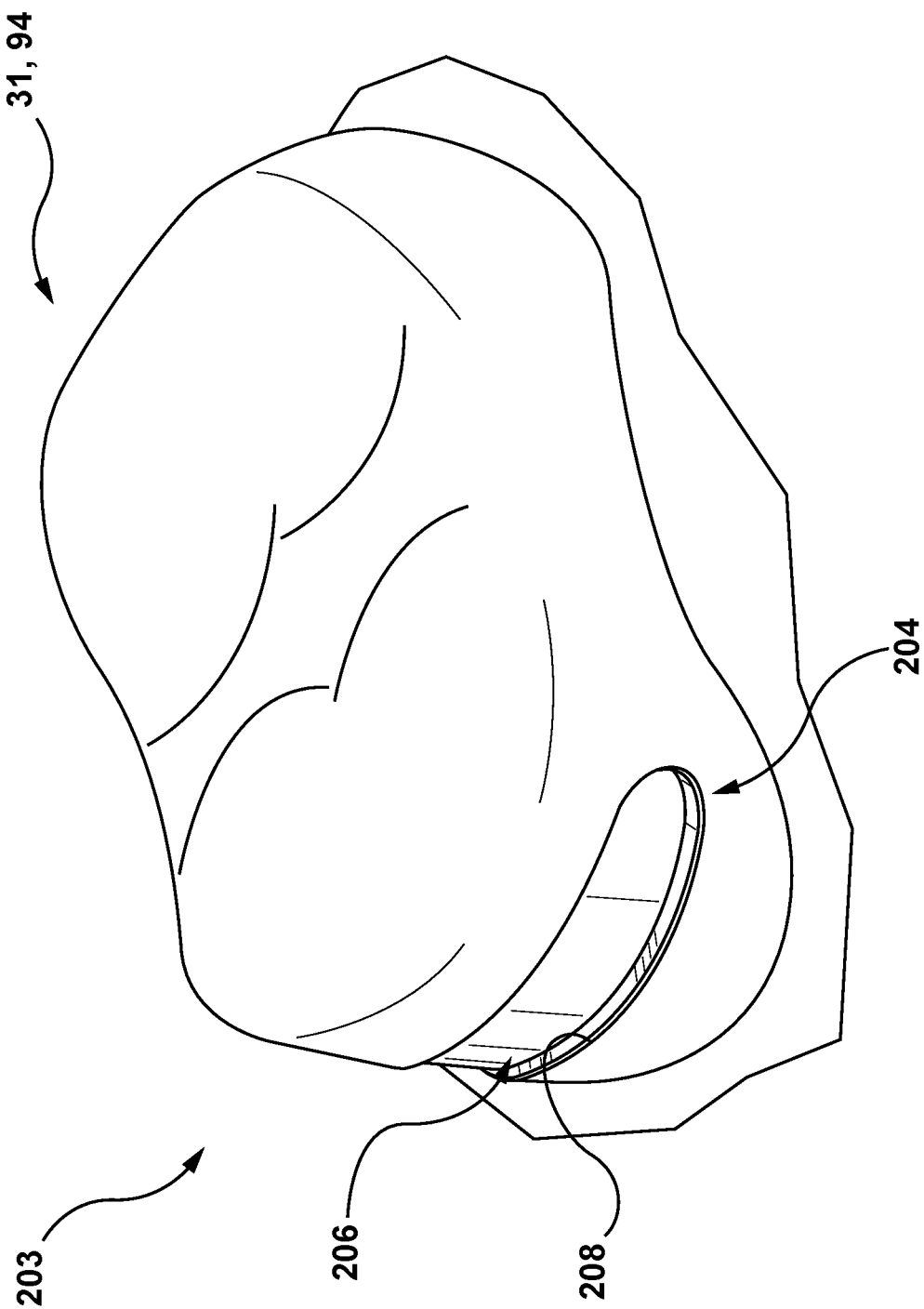
FIG. 17 illustrates the digital model of the upper arch of FIG. 7, shown with a recessed region, used during the method of FIG. 7 according to certain embodiments of the present technology.

In certain embodiments, the digital archform model 94 comprises at least a portion representative of the shaping portion 210 (FIG. 6) of the aligner mold 46 to be used for shaping the precursor aligner 44 using the thermoforming device 132. In some such embodiments, the method 300 further comprises, in Step 354, generating a digital mold model 203 representing the aligner mold 46. The digital mold model 203 includes the digital tooth model 31, in which digital recessed regions 204 are defined. The digital recessed regions 204 are configured for shaping the fixing blocks 11 via corresponding recessed regions 99 (FIG. 6) of the aligner mold 46. As shown in FIG. 17, the palatal recessed region 204 has a cut-out region 206 extending inside the digital tooth model 31 and a chamfer 208 defined on an outer boundary of the cut-out region 206. The cut-out region 206 is generated by cutting out a shape of the digital fixing block model 234 from the digital aligner mold 203.

In FIG. 18, the precursor aligner 44 is shown shaped onto the aligner mold 46 as a result of a thermoforming operation using the thermoforming device 132.

In some such embodiments, the method further comprises, in Step 356, chamfering an outer boundary of the cut-out region 206 to define the chamfer 208. It is contemplated that making the aligner mold 46 based on the digital mold model 203 having a chamfered recessed region 204 results in the aligner mold 46 having chamfered recessed regions 99 which can, under certain circumstances, aid shaping of the fixing blocks 11 during the thermoforming operation and unmolding of the aligner 10 from the aligner mold 46 following the thermoforming operation.

In some embodiments, the method 300 further comprises, in Step 358, transmitting instructions indicative of the digital mold model 203 to a device of the manufacturing apparatus 130, for example the additive manufacturing device 136, for making the aligner mold 46.

STEP 360: Generating the Digital Aligner Model by Joining the Digital Fixing Block Model with the Digital Aligner Body Model.

In some embodiments, the method 300 continues, in Step 360, by generating the digital aligner model 235 by joining the digital fixing block models 234 to the digital aligner body model 233. The digital fixing block models 234 are joined to the digital inner surface 90 via portions of the digital fixing block models 234 opposite their respective fixing-block coupling surface 13, thereby unitarily forming the digital aligner model 235.

In some such embodiments, the method 300 further continues by sending instructions indicative of the digital aligner model 235 to a device of the manufacturing apparatus 130, for example the additive manufacturing device 136, for making the aligner 10.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method for generating a digital aligner model of a desired aligner configured to be operatively coupled to a tooth of a given dental archform when in a desired orthodontic relationship relative to the tooth, the desired aligner having:
    an aligner body defining a channel arranged for receiving the tooth so as to establish the desired orthodontic relationship; and
    a fixing block defined on the aligner body and extending into the channel, the fixing block being arranged relative to the aligner body for operatively coupling the aligner and the tooth,
the method being implemented by a processor of a computer system, the method comprising:

acquiring a digital archform model representing the given dental archform, the digital archform model including a digital tooth model representing the tooth;

defining a dark zone on the digital tooth model, the dark zone being representative of a portion of the tooth sheltered from a ray of light incident toward an occlusal side of the tooth;

determining, based on the dark zone, a tooth-coupling surface being indicative of an outer surface of the tooth for operatively coupling the tooth with the desired aligner;

generating, based on the digital tooth model, a digital aligner body model by generating an inner body surface of the digital aligner body model based on the digital tooth model, the inner body surface having the channel of the desired aligner;

generating, based on the determined tooth-coupling surface, a fixing block coupling surface being indicative of an outer surface of the fixing block of the desired aligner by digitally extruding the tooth-coupling surface by an interference length to inward of the digital tooth model so as to generate a digital fixing block model, the digital fixing block model having the generated fixing block coupling surface;

generating the digital aligner model by joining the digital fixing block model with the digital aligner body model.

2. The method of claim 1, wherein the determining the tooth-coupling surface includes:

determining mesial and distal surfaces of the dark zone;

subtracting the determined mesial and distal surfaces from the dark zone so as to define a remainder surface, the determined tooth-coupling surface being based on the remainder surface.

3. The method of claim 2, wherein the determining the tooth-coupling surface includes normalizing the defined remainder surface so as to define the tooth-coupling surface.

4. The method of claim 2, wherein the determining the mesial surface and the distal surface comprises determining an occlusal surface, a buccal surface and a lingual surface from the digital tooth model, the mesial surface and the distal surface respectively forming portions of the digital tooth model excluding the occlusal, buccal and lingual surfaces.

5. The method of claim 4, wherein:

the occlusal surface represents the occlusal side of the tooth;

the lingual surface is oriented orthogonally relative to the occlusal surface and faces inwardly of a curve of the digital archform model; and the buccal surface is oriented orthogonally relative to the occlusal surface and faces outwardly of the curve of the digital archform model.

6. The method of claim 5, wherein the determining the mesial surface and the distal surface comprises:

determining an anatomical center point of the digital tooth model; and determining the curve based on a plurality of given points defined relative to the digital archform model, the plurality of given points including the anatomical center point of the digital tooth model.

7. The method of claim 6, wherein at least one of the plurality of given points is an anatomical center of a second digital tooth model of the digital archform model.

8. The method of claim 6, wherein the determining the mesial surface and the distal surface comprises determining a geometrical curve center point being equidistant from each one of the plurality of given points.

9. The method of claim 8, wherein:

the anatomical center point of the digital tooth model is intermediate distal and mesial points of the digital tooth model;

the distal point and the mesial point define a distal-mesial tooth axis;

a lingual-buccal tooth axis is defined through the anatomical center point of the digital tooth model and orthogonally to the distal-mesial tooth axis;

the lingual and buccal surfaces are respectively circumscribed within a certain angle range originating from the anatomical center point of the digital tooth model and defined relative to the lingual-buccal tooth axis; and the lingual surface is distinguished from the buccal surface due to being oriented generally toward the geometrical curve center point.

10. The method of claim 1, further comprising defining a recessed region in the digital tooth model for generating a digital mold model for producing a thermoforming mold for making the desired aligner, the defining the recessed region including defining a cut-out region in the digital tooth model, the defined cut-out region being sized for receiving the generated digital fixing block model.

11. The method of claim 10, wherein the defining the recessed region includes chamfering an outer boundary of the defined cut-out region.

12. The method of claim 10, further comprising transmitting the digital mold model to a 3D printer for producing the thermoforming mold for making the desired aligner.

13. The method of claim 1, further comprising determining the interference length such that when the desired aligner is operatively coupled to the tooth, the desired aligner is retained in the orthodontic relationship relative to the tooth.

14. The method of claim 1, wherein the interference length is pre-determined.

15. The method of claim 14, wherein the interference length is 0.1 mm.

16. The method of claim 1, wherein the determining the dark zone with respect to the tooth comprises orienting the given dental archform relative to the ray of light in a desired orientation so as to cause a portion of the tooth to be sheltered from the ray of light.

17. The method of claim 16, wherein the desired orientation is pre-determined.

18. The method of claim 1, further comprising receiving a treatment plan outlining a desired shape of the aligner body.

19. The method of claim 1, wherein the aligner body and the fixing block are unitarily formed.

20. A system for generating a digital aligner model of a desired aligner configured to be operatively coupled to a tooth of a given dental archform when in a desired orthodontic relationship relative to the tooth, the desired aligner having:

an aligner body defining a channel arranged for receiving the tooth so as to establish the desired orthodontic relationship; and a fixing block defined on the aligner body, the fixing block being arranged relative to the aligner body for operatively coupling the aligner to the tooth;

the system comprising a processor of a computer system, the processor arranged to execute a method comprising:

acquiring a digital archform model representing the given dental archform, the digital archform model including a digital tooth model representing the tooth;

defining a dark zone on the digital tooth model, the dark zone being representative of a portion of the tooth sheltered from a ray of light incident toward an occlusal side of the tooth;

determining, based on the dark zone, a tooth-coupling surface being indicative of an outer surface of the tooth for operatively coupling the tooth with the desired aligner;

generating, based on the digital tooth model, a digital aligner body model by generating an inner body surface of the digital aligner body model based on the digital tooth model, the inner body surface having the channel of the desired aligner;

generating, based on the determined tooth-coupling surface, a fixing block coupling surface being indicative of an outer surface of the fixing block of the desired aligner by digitally extruding the tooth-coupling surface by an interference length to inward of the digital tooth model so as to generate a digital fixing block model, the digital fixing block model having the generated fixing block coupling surface;

generating the digital aligner model by joining the digital fixing block model with the digital aligner body model.

* * * * *